(12) United States Patent
Tandon et al.

(10) Patent No.: US 6,961,157 B2
(45) Date of Patent: Nov. 1, 2005

(54) IMAGING APPARATUS HAVING MULTIPLE LINEAR PHOTOSENSOR ARRAYS WITH DIFFERENT SPATIAL RESOLUTIONS

(75) Inventors: Jagdish C. Tandon, Fairport, NY (US); Keith T. Knox, Rochester, NY (US); Robert R. Buckley, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 661 days.

(21) Appl. No.: 09/867,323

(22) Filed: May 29, 2001

(65) Prior Publication Data

US 2002/0181033 A1 Dec. 5, 2002

(51) Int. Cl.[7] .............................. H04N 1/46; H04N 1/04; H04N 9/64; H04N 9/83; H01L 27/00
(52) U.S. Cl. ...................... 358/512; 358/513; 358/514; 358/482; 358/483; 348/272; 348/273; 348/29; 250/208.1
(58) Field of Search ................................ 358/512, 514, 358/513, 482, 483, 474; 348/29, 272, 273; 250/208.1

(56) References Cited

U.S. PATENT DOCUMENTS

| 5,055,921 A | * | 10/1991 | Usui .......................... 358/512 |
| 5,148,268 A | | 9/1992 | Tandon et al. ................ 358/41 |
| 5,543,838 A | | 8/1996 | Hosier et al. ............... 348/311 |
| 5,550,653 A | | 8/1996 | TeWinkle et al. ........... 358/514 |
| 5,675,425 A | * | 10/1997 | Imoto et al. ................ 358/513 |
| 5,773,814 A | * | 6/1998 | Phillips et al. ........... 250/208.1 |
| 6,009,214 A | * | 12/1999 | Suggs ........................ 382/312 |
| 2002/0093694 A1 | * | 7/2002 | Spears ....................... 358/474 |
| 2002/0093697 A1 | * | 7/2002 | Spears et al. .............. 358/514 |

* cited by examiner

Primary Examiner—Edward Coles
Assistant Examiner—Houshang Safaipour
(74) Attorney, Agent, or Firm—R. Hutter

(57) ABSTRACT

In an imaging apparatus such as a scanner or digital camera, a photosensitive device includes multiple linear arrays of photosensors. One of the arrays has a higher spatial resolution than other arrays. The high-resolution array is filtered to detect different portions of the color spectrum than the low-resolution arrays.

17 Claims, 7 Drawing Sheets

FIG. 5
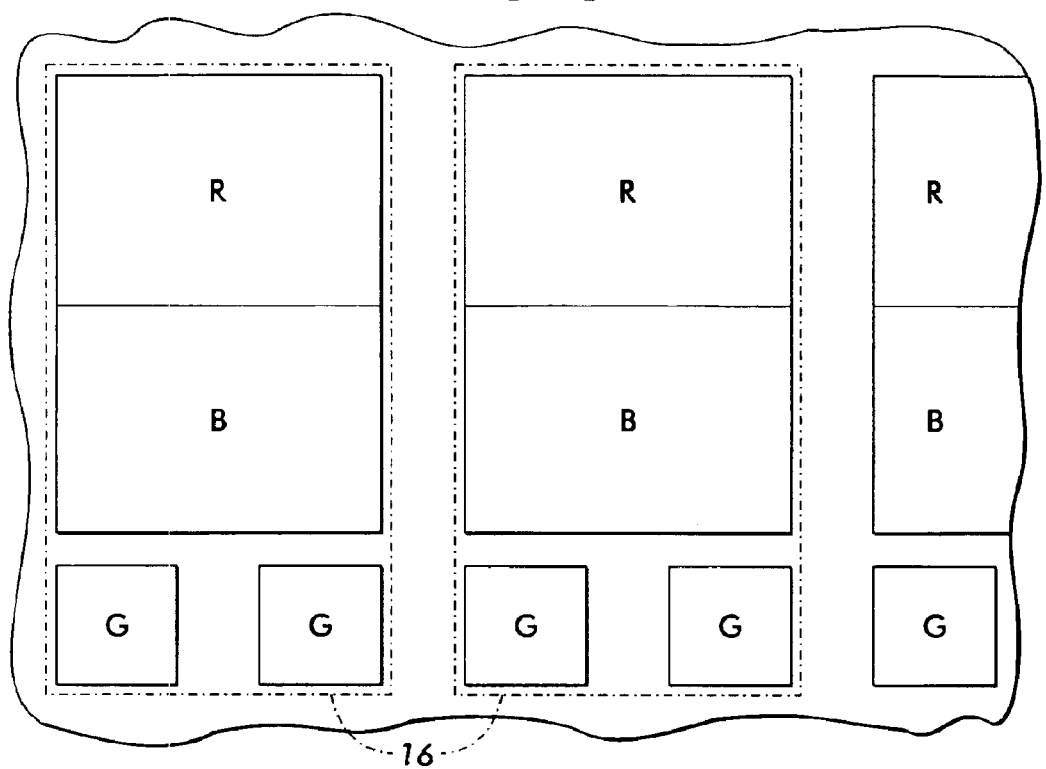
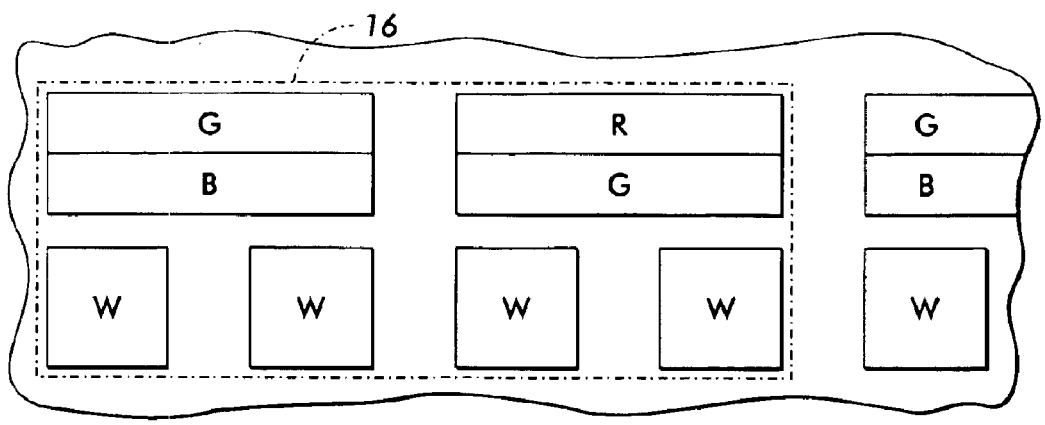
FIG. 6

FIG. 9
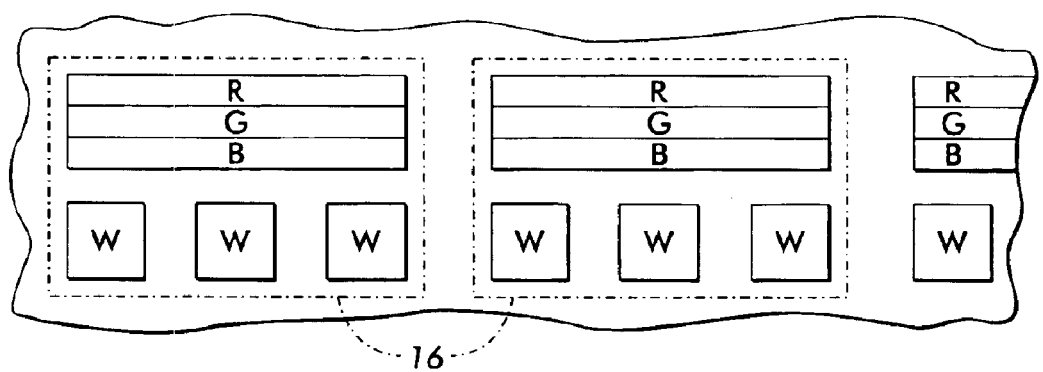
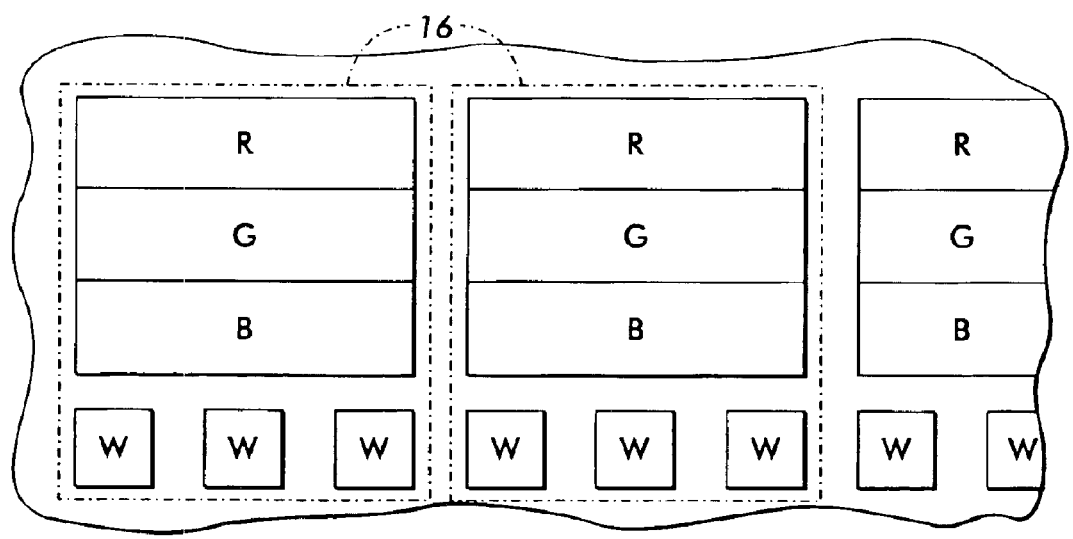
FIG. 10

FIG. 12
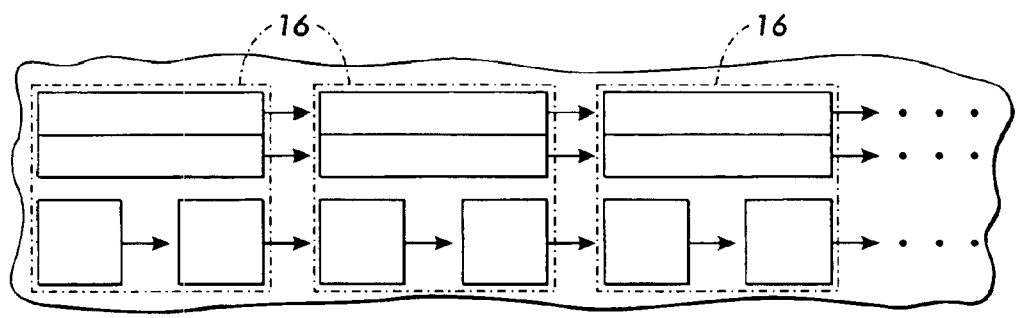
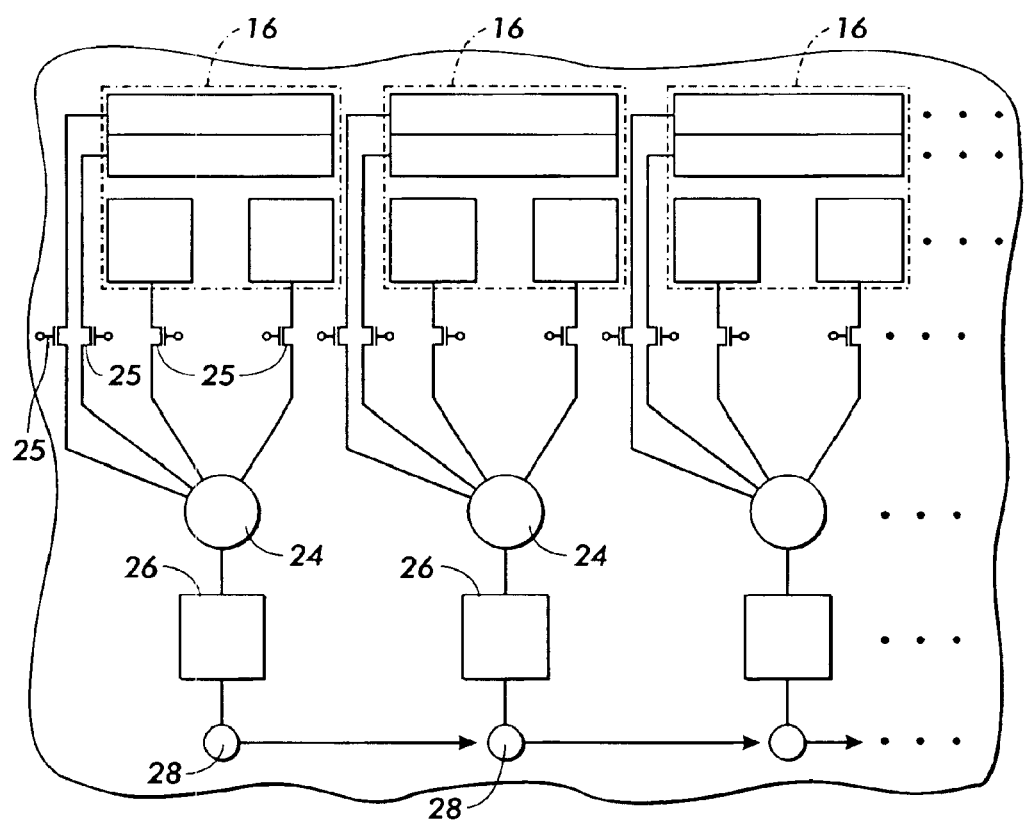
FIG. 13

IMAGING APPARATUS HAVING MULTIPLE LINEAR PHOTOSENSOR ARRAYS WITH DIFFERENT SPATIAL RESOLUTIONS

INCORPORATION BY REFERENCE

The following U.S. Patents, all assigned to the assignee hereof, are hereby incorporated by reference for their teachings relating to the structure and operation of full-color photosensitive devices such as used in office equipment and digital cameras: U.S. Pat. Nos. 5,148,268; 5,543,838; and 5,550,653.

FIELD OF THE INVENTION

The present invention relates to color photosensitive devices, such as used in image input scanners and digital cameras, wherein light from an image received by the device is converted to a set of image signals.

BACKGROUND OF THE INVENTION

Monochrome image sensor arrays typically comprise a linear array of photosensors which raster scan an image bearing document and convert the reflected light from each microscopic image area viewed by each photosensor over time to image signal charges. Following an integration period, the image signals are amplified and transferred to a common output line or bus through successively actuating multiplexing transistors.

In a well-known design of a photosensitive device such as used in an image input scanner, separate linear arrays of photosensors are arranged in parallel on a single sensor bar, and caused to move in a scan direction relative to the original image generally perpendicular to the direction of the arrays. The photosensors in each array are provided with a filter thereon of one primary color. As the sensor bar including the three rows of photosensors moves along the original image, each portion of the area of the original image is exposed to each of the rows of photosensors. As each filtered row of photosensors moves past each particular area in the original image, signals according to the different primary color separations of that area are output by the particular photosensors in each row. In this way, three separate sets of signals, each relating to one primary color, will be produced by the linear arrays of photosensors.

In practical applications of full-color input scanner arrays, the original documents or images which are typically scanned in can be roughly divided into two types: relatively sophisticated color images, such as color photographs, wherein a maximal amount of color information from the original is desirable, and from which information may be highly random; and simpler color images, such as those known as "highlight color" or "business color" images, in which the color relationships in the original image are not very complicated. For example, in a typical business document, the color portion of an image could be no more sophisticated than a color graph or pie-chart. Further, it is typical in business color or highlight color documents that the tone or shade of a particular color is consistent throughout a single graphic illustration. The fact that such highlight-color documents are fairly common in business presents opportunities for significantly increasing the efficiency at which original images can be converted into digital data, such as by decreasing the amount of digital memory space required to retain the image data, provided it is known in advance that the incoming document is of the business-color or highlight-color type.

There are typically two types of images which are recorded in document scanning: text, and images. With text, the sharpness of the recorded image, which relates to the spatial resolution of the recording process, is desirably maximized. With images such as photographs, however, sharpness may not be as much of a premium. Even where complicated images such as full-color photographs are being recorded, there may be disadvantages to obtaining a maximal amount of color data from an original image. Large amounts of image data from a scanner may impact process speed and/or data capacity of downstream memory. In many cases, it is possible that only a portion of the total information from the original image is required to reconstruct the image in a satisfactory manner.

The present invention is directed to photosensor configurations of photosensitive devices for recording full-color images, in which photosensors for recording different primary colors have different spatial resolutions.

DESCRIPTION OF THE PRIOR ART

U.S. Pat. Nos. 5,148,268 and 5,543,838 disclose circuit designs for color image sensor arrays for recording full-color original images as digital data.

U.S. Pat. No. 5,550,653 discloses a color sensor array in which signals related to certain primary colors are sampled at a lower rate than signals from other primary colors.

It is known in the prior art to provide two-dimensional photosensor arrays in which photosensors sensitive to certain primary colors have different effective spatial resolutions than photosensors sensitive to other primary colors.

SUMMARY OF THE INVENTION

According to the present invention, there is provided an imaging apparatus comprising a first linear array of photosites, arranged in an array direction, and having a first spatial resolution along the array direction, a second linear array of photosites, having a second spatial resolution, different from the first spatial resolution, along the array direction, and means for moving an original image relative to the linear arrays of photosites in a process direction perpendicular to the array direction.

BRIEF DESCRIPTION OF THE DRAWINGS

FIGS. 3–11 are detailed plan views illustrating different arrangements of photosensors, according to various embodiments of the present invention.

FIG. 12 is a simplified illustration of one readout system usable with the present invention.

FIG. 13 is a simplified illustration of another readout system usable with the present invention.

DETAILED DESCRIPTION OF THE INVENTION

Figure 1:
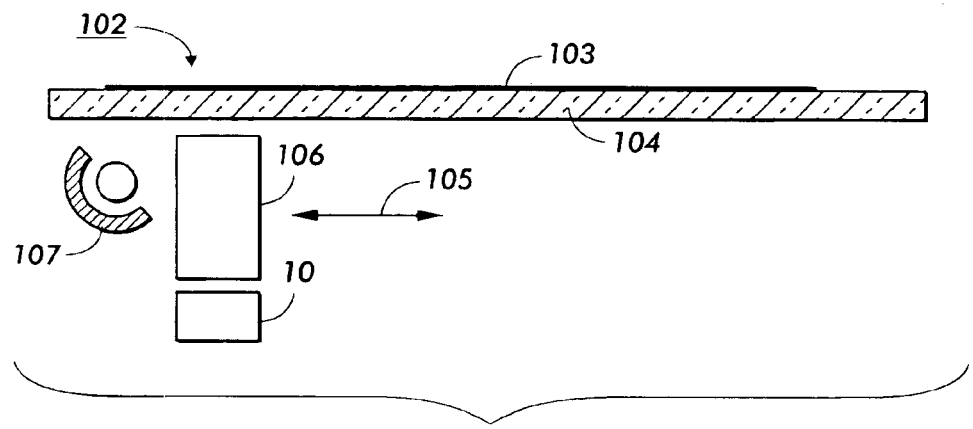
FIG. 1 is an elevational view showing the essential elements of a scanner which can be used with the present invention.

Referring to FIG. 1, there is shown an exemplary raster input scanner, designated generally by the numeral 102, of the type adapted to use a scanning array, or sensor bar, 10. Sensor bar 10 comprises a linear full width array having a scan width in the fast scan direction substantially equal to or slightly greater than the width of the largest document 103 or other object to be scanned. Documents to be scanned are supported on a generally rectangular transparent platen 104, typically glass, sized to accommodate the largest original document 103 to be scanned. A document 103 to be scanned is located either manually or by a suitable automatic document handler or feeder (not shown) on platen 104 for scanning. Array 10 is supported for reciprocating scanning movement in the scan direction depicted by arrows 105 below platen 104 by a movable scanning carriage (not shown). A lens 106 focuses array 10 on a line-like area extending across the width of platen 104. One or more lamp and reflector assemblies forming a light source 107 are provided for illuminating the line-like area on which array 10 is focused.

Figure 2:
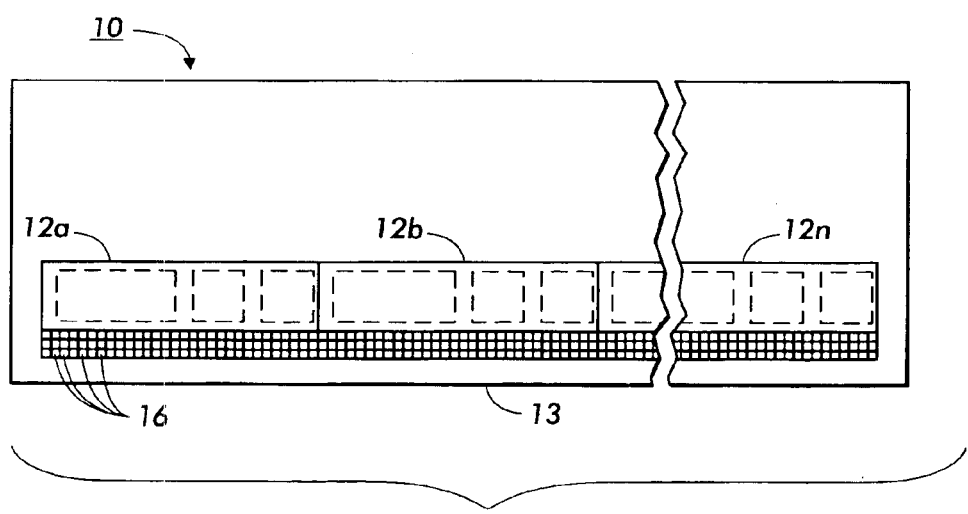
FIG. 2 is a plan view showing an arrangement of photosensitive chips used in the scanner of FIG. 1.

Referring to FIG. 2, there is shown a long or full width sensor bar 10 composed of a plurality of smaller sensor chips 12 assembled together end-to-end (specific chips are identified by numerals 12a, 12b, . . . 12n) on an elongated generally rectangular rigid substrate 13.

Chips 12, which may, for example, be charge coupled devices (CCDs) or MOS or CMOS sensor arrays, are relatively thin silicon dies having a generally rectangular shape. A set of photosite areas, or cells, 16 parallel the longitudinal axis of the chips. Other active elements such as shift registers, gates, pixel clock, etc., are preferably formed integrally with chips 12. Suitable external connectors (not shown) are provided for electrically coupling the chips 12 to related external circuitry.

In the case of color scanning, the individual photosite areas 16 are typically subdivided into three sets of photosites, enabling the photosite areas to detect three different wavelength ranges. Normally, these comprise the three primary colors, i.e., blue, green, and red. As shown in FIG. 2, the standard practice has been to have three differently filtered rows of photosites, with photosites in each row having the same spatial resolution.

FIGS. 3–11 show, in plan view, various configurations of photosites 16 and accompanying color filter arrangements according to various aspects of the present invention. In overview, each of the different configurations in the figures share the common characteristic that one particular linear array defines, along its array direction, (that is, horizontally in the view of the figures), one spatial resolution, while other linear arrays have a different spatial resolution along the array direction. When an image to be recorded is caused to move relative to the array in a process direction perpendicular to the array direction, one particular linear array having the smallest photosites along the array direction will record light from the image at a high resolution, by virtue of the relatively small areas on the image recorded by the photosites. In contrast, the other linear arrays, having relatively larger photosite areas, will record relatively larger small areas of reflected light from the image.

In the following description, each set of photosensors which in any sense function together, such as by having a complementary set of color filters, will be referred to as a "cell" 16. It will be noted, of course, that within any single cell 16, there are provided portions of different linear arrays of photosensors, and, as described in certain of the claims below, different linear arrays will have different spatial resolutions, such as in the horizontal direction as illustrated in the Figures.

According to another aspect of the present invention, the different linear arrays, having different resolutions, are respectively designed to be sensitive to different portions of the visible spectrum. One well-known technique for making different arrays of photosites sensitive to different colors is to provide, over the photosites, light-transmissive filter layers, such as including polyimide or acrylic, which cause one specific band of the visible light spectrum to affect the photosite. In the illustrated embodiments, the different photosites are indicated as being filtered to admit primary colors such as red (R), green (G), or blue (B) light, although other types of filters, such as for admitting orange, yellow, magenta, or cyan (i.e., other types of primary colors) can be envisioned. Also, in some embodiments, certain sets of photosites can be designed to admit white (W) light, that is, light from substantially all of the visible spectrum (in the discussion below, such photosites will be called "white-filtered," even though in certain implementations this may mean that there is no visible-light filter on the photosite at all).

Figure 3:
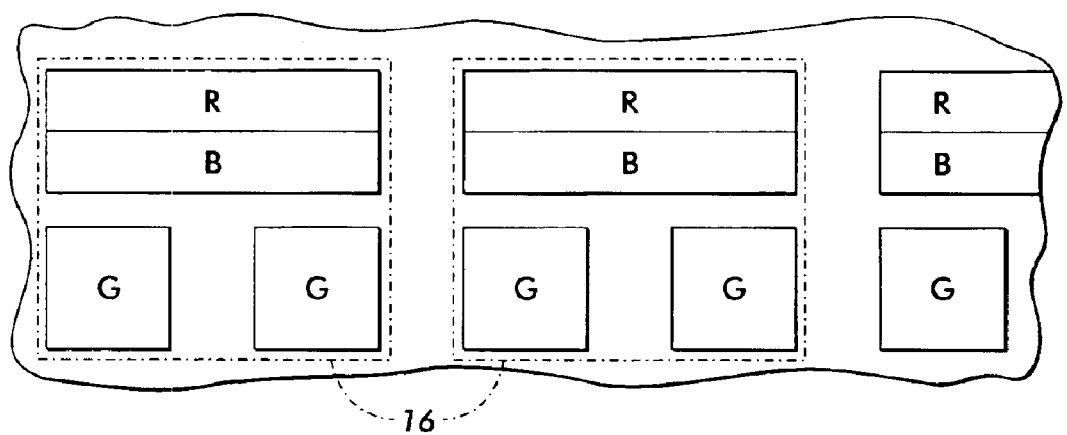
Figure 4:
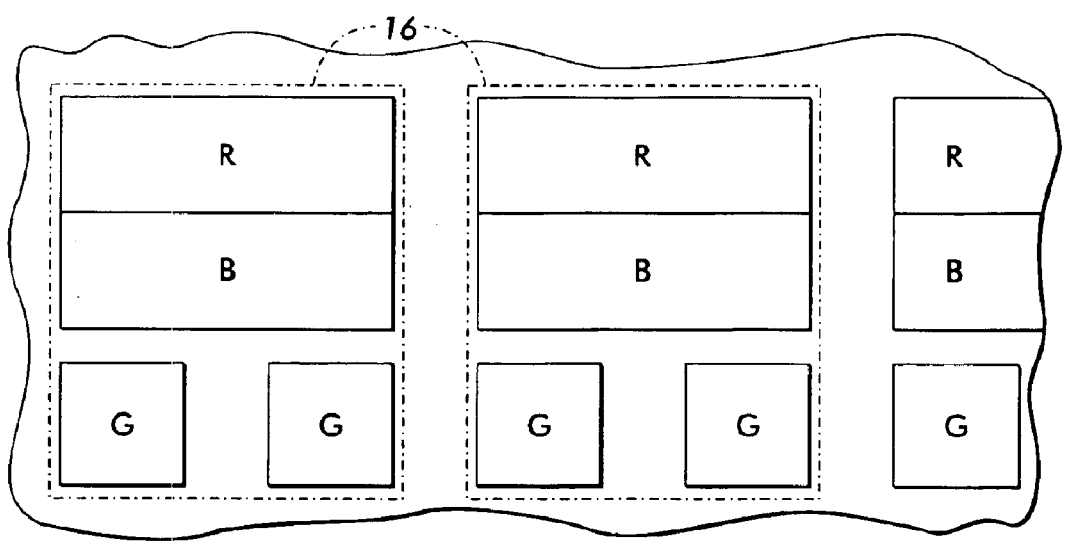

In the arrangements of FIG. 3–5, along the array direction two green-filtered photosites correspond to each blue and red photosite. The embodiments differ in that for different embodiments the length of some photosites along the process direction is different: in FIG. 3, if the green, high-resolution photosites have an effective length n along the process direction, each of the red and blue photosites has a length of n/2, while in FIG. 4 the process direction length is n and in FIG. 5 the process direction length is 2 n. In general, and in reference to all the illustrated embodiments, having a relatively short process direction length for the low-resolution arrays enables relatively balanced signal intensity relative to the high-resolution array, with the sampled small areas for each type of photosite being almost co-located in the original image. With larger process direction lengths for the low-resolution arrays, more of the signal is averaged at each photosite. This reduces the higher spatial frequencies that beat with the sampling array to produce aliasing. As a result, aliasing will be progressively reduced as the process direction length is increased.

Figure 7:
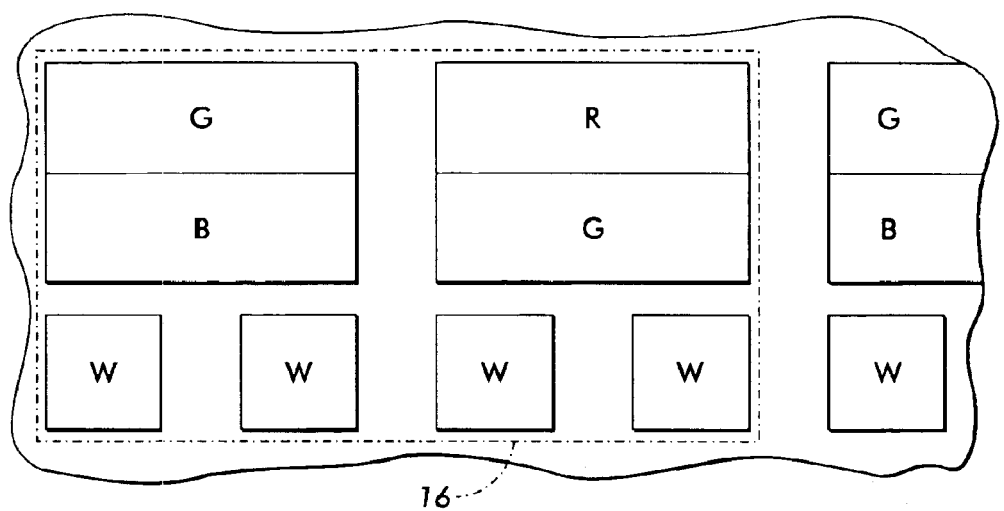
Figure 8:
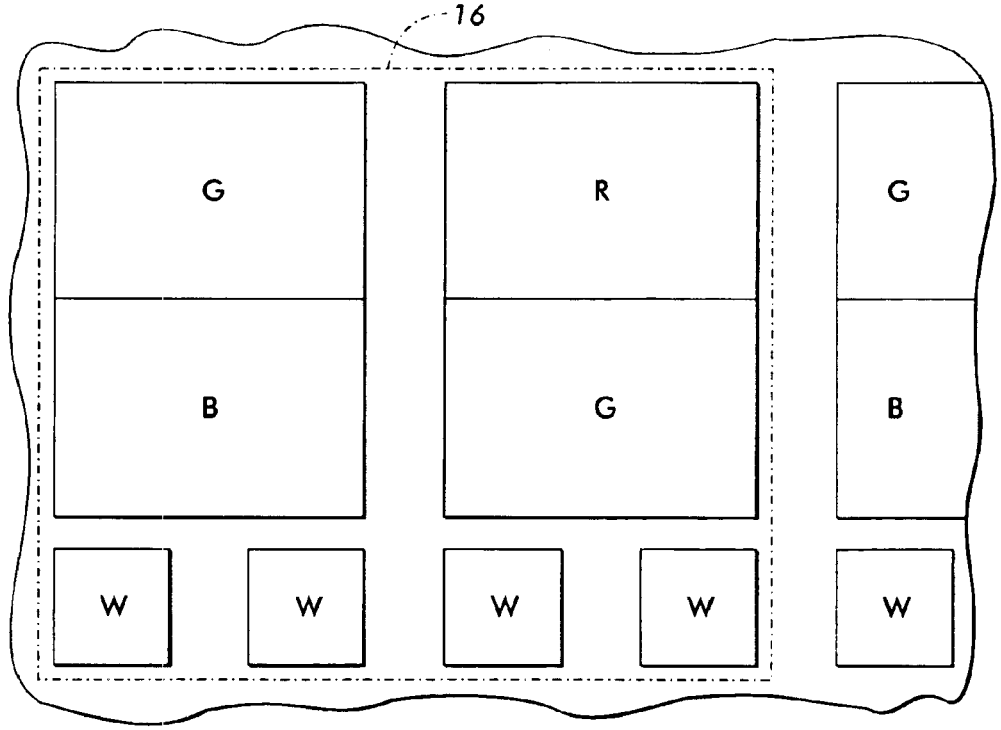

In the embodiments of FIGS. 6–8, each photosite in the high-resolution array is filtered white, while, in the low-resolution arrays, alternating sets of photosites are filtered with red and blue in addition to green, as shown. the green photosites are repeated more often than the red or blue photosites.

Figure 11:
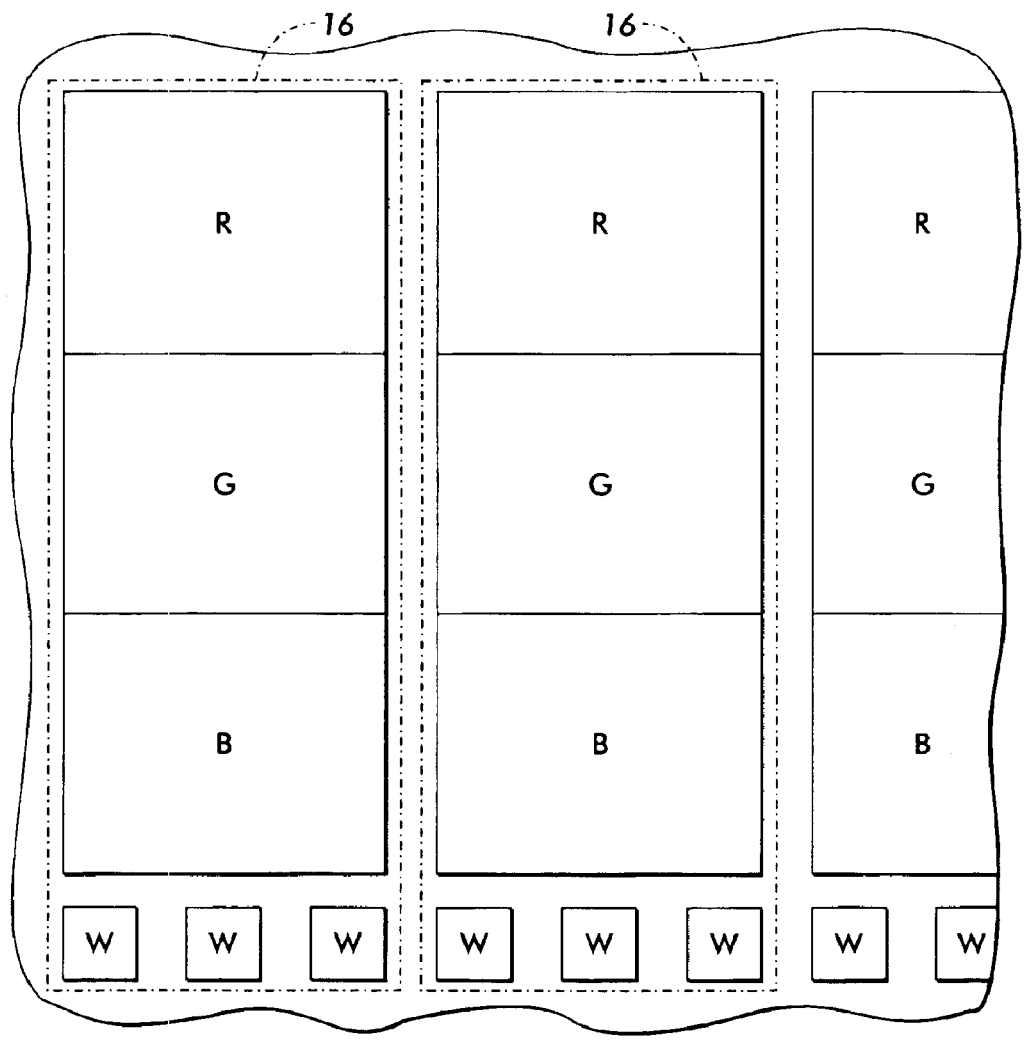

In the embodiments of FIGS. 9–11, each white-filtered photosite in the high-resolution array corresponds to one low-resolution photosite, of which there are three, each filtered to admit one primary color. For every three white photosites there three color (R, G, and B) photosites.

A photosensitive device according to various aspects of the invention can be embodied in any number of types of technology. For office equipment, the two most common scanning technologies are charge-coupled device (CCD), and CMOS. FIG. 12 illustrates how a set of arrays pursuant to the present invention can be realized as set of parallel CCD arrays. As can be seen, the high-resolution array is simply a CCD array which operates in parallel to one or more low-resolution arrays: for each array, signals are carried from one cell 16 to the next in the well-known CCD fashion. Downstream circuitry, not shown, can coordinate the different CCD signal trains to obtain useable full-color image data.

FIG. 13 illustrates how a set of arrays pursuant to the present invention can be realized as a CMOS device. In this embodiment, each primary-color photosite within each cell 16 is connected to a common reset node 24: significantly, in this embodiment, multiple photosites in the high-resolution array are attached to one reset node 24. Connections from individual photosites can be made to node 24 by independently-controllable transistor switches 25. Signals stored temporarily at reset node 24 are eventually passed through transfer circuits 26 and output through an output line marked by nodes 28. Although the practical circuitry for realizing the CMOS embodiment is not shown completely in the Figure, the teachings of U.S. Pat. Nos. 5,148,268 and 5,543,838, referenced above, can be adapted for the purpose.

While the invention is described in the context of the three primary colors, the invention is not limited to those colors or color combination. Other colors and color combinations such as cyan, magenta and yellow, etc. may instead be envisioned. Also, while a three color sensor is disclosed, color sensors containing photodiodes of any number may be envisioned.

What is claimed is:

1. An imaging apparatus comprising:
   a first linear array of photosites, arranged in an array direction, having a first color filtering arrangement whereby all of the photosites in the first linear array are filtered to receive a single color, and having a first spatial resolution along the array direction;
   a second linear array of photosites, having a second spatial resolution along the array direction, three photosites in the first linear array corresponding to each one photosite in the second linear array, the second linear array of photosites having a second color filtering arrangement, different from the first color filtering arrangement; and
   means for moving an original image relative to the linear arrays of photosites in a process direction perpendicular to the array direction.

2. The apparatus of claim 1, the first color filtering arrangement being white, and the second color filtering arrangement including a primary color.

3. The apparatus of claim 1, the first color filtering arrangement being green, and the second color filtering arrangement including a primary color.

4. The apparatus of claim 1, the first linear array of photosites having an effective length n along a process direction perpendicular to the array direction, and the second linear array of photosites having an effective length along the process direction equal to n.

5. The apparatus of claim 1, the first linear array of photosites having an effective length n along a process direction perpendicular to the array direction, and the second linear array of photosites having an effective length along the process direction greater than n.

6. The apparatus of claim 1, the first linear array of photosites having an effective length n along a process direction perpendicular to the array direction, and the second linear array of photosites having an effective length along the process direction less than n.

7. The apparatus of claim 1, the first linear array having an effective length n along a process direction perpendicular to the array direction, and the second linear array having an effective length along the process direction of about 3 n.

8. The apparatus of claim 1, further comprising a third linear array of photosites, the third linear array of photosites having a spatial resolution along the array direction equal to the spatial resolution of the second linear array of photosites.

9. The apparatus of claim 8, the third linear array of photosites having a third color filtering arrangement, different from the second color filtering arrangement.

10. The apparatus of claim 9, the first color filtering arrangement being green, the second color filtering arrangement being a first non-green primary color, the third color filtering arrangement being a second non-green primary color different from the first non-green primary color.

11. The apparatus of claim 9, the first color filtering arrangement being white, the second color filtering arrangement being a first non-green primary color, the third color filtering arrangement being a second non-green primary color different from the first non-green primary color.

12. The apparatus of claim 1, wherein the first linear array is associated with a first CCD, and the second linear array is associated with a second CCD.

13. The apparatus of claim 1, wherein a plurality of photosites in the first linear array and a photosite in the second linear array are associated with a single transfer circuit connected to an output line.

14. An imaging apparatus comprising:
   a set of cells of photosites arranged in a linear array along an array direction, each cell defining three small photosites, arranged along the array direction, and each cell defining at least two large photosites, arranged perpendicular to the array direction, the small photosites in each cell being filtered to admit white light and at least one of the two large photosites in each cell being filtered to admit a primary color; and
   means for moving an original image relative to the linear arrays of photosites in a process direction perpendicular to the array direction.

15. The apparatus of claim 14, each small photosite in each cell having a length perpendicular to the array direction of n, and each large photosite in each cell having a length perpendicular to the array direction of less than n.

16. The apparatus of claim 14, each cell defining three large photosites, filtered respectively to admit substantially red, green, and blue light.

17. The apparatus of claim 14, at least one small photosite and one large photosite in each cell being associated with a common reset node.

* * * * *